United States Patent
Yang et al.

(10) Patent No.: US 10,623,807 B2
(45) Date of Patent: Apr. 14, 2020

(54) APPARATUS FOR TRANSMITTING TV SIGNALS USING WIFI

(71) Applicant: SHENZHEN ANTOP TECHNOLOGY LIMITED, Shenzhen (CN)

(72) Inventors: Ruidian Yang, Shenzhen (CN); Zhiyou Jiang, Shenzhen (CN); Gaofeng Ni, Shenzhen (CN)

(73) Assignee: SHENZHEN ANTOP TECHNOLOGY LIMITED, Shenzhen (CN)

( * ) Notice: Subject to any disclaimer, the term of this patent is extended or adjusted under 35 U.S.C. 154(b) by 0 days.

(21) Appl. No.: 15/904,873

(22) Filed: Feb. 26, 2018

(65) Prior Publication Data

US 2018/0249204 A1 Aug. 30, 2018

(30) Foreign Application Priority Data

Feb. 24, 2017 (CN) .......................... 2017 1 0103748

(51) Int. Cl.
*H04N 21/4363* (2011.01)
*H04N 21/426* (2011.01)
(Continued)

(52) U.S. Cl.
CPC . *H04N 21/43637* (2013.01); *H04N 21/41407* (2013.01); *H04N 21/4263* (2013.01);
(Continued)

(58) Field of Classification Search
CPC ......... H04N 21/43637; H04N 21/4263; H04N 21/6125; H04N 21/440263; H04N 21/440218; H04N 21/434; H04N 21/44008
See application file for complete search history.

(56) References Cited

U.S. PATENT DOCUMENTS 9,313,552 B1 * 4/2016 Park ....................... H04H 20/08
9,681,183 B1 * 6/2017 Majid ............ H04N 21/440218
(Continued)

*Primary Examiner* — Pinkal R Chokshi
(74) *Attorney, Agent, or Firm* — Muncy, Geissler, Olds & Lowe, P.C.

(57) ABSTRACT

The present application discloses an apparatus for transmitting TV signals using WIFI, comprising an antenna, 3-way distributors, a television, a first tuning demodulator, a second tuning demodulator, a first decoder, a second decoder, a signal control processing unit and a WIFI communication module, wherein the antenna is electrically connected with the 3-way distributors; the 3-way distributors are electrically connected with the television, the first tuning demodulator and the second tuning demodulator; respectively, the first tuning demodulator and the second tuning demodulator are electrically connected with the first decoder and the second decoder; the first tuning demodulator and the second tuning demodulator are further electrically connected with the signal control processing unit; the first decoder and the second decoder are electrically connected with the signal control processing unit, respectively; the signal control processing unit is electrically connected with the WIFI communication module connected with the mobile user terminal; the signal control processing unit adjusts the resolution of the data according to the information of the mobile user terminal, then encodes, packs and finally sends the data to the WIFI communication module, and the WIFI communication module converts the data into WIFI stream to be sent to the mobile user terminal.

5 Claims, 3 Drawing Sheets

(51) Int. Cl.
    *H04N 21/61*     (2011.01)
    *H04N 21/4402*     (2011.01)
    *H04N 21/434*     (2011.01)
    *H04N 21/44*     (2011.01)
    *H04N 21/414*     (2011.01)
    *H04N 21/45*     (2011.01)

(52) U.S. Cl.
    CPC ..... *H04N 21/434* (2013.01); *H04N 21/44008* (2013.01); *H04N 21/440218* (2013.01); *H04N 21/440263* (2013.01); *H04N 21/4516* (2013.01); *H04N 21/6125* (2013.01)

(56) References Cited

U.S. PATENT DOCUMENTS

| | | | |
|---|---|---|---|
| 9,693,105 B2 * | 6/2017 | Smith | H04N 21/23106 |
| 2002/0191081 A1 * | 12/2002 | Ueyama | H04N 5/232 348/207.1 |
| 2006/0268166 A1 * | 11/2006 | Bossen | H04N 19/70 348/390.1 |
| 2008/0089362 A1 * | 4/2008 | Ezra | H04L 12/2801 370/493 |
| 2010/0278230 A1 * | 11/2010 | MacInnis | H04N 19/172 375/240.02 |
| 2013/0103822 A1 * | 4/2013 | Wolcott | H04L 41/12 709/224 |
| 2013/0139195 A1 * | 5/2013 | Ciciora | H04N 21/44008 725/19 |
| 2013/0336380 A1 * | 12/2013 | Mese | H03M 7/6047 375/240.02 |
| 2014/0282699 A1 * | 9/2014 | Fertig | H04N 21/231 725/32 |
| 2018/0184164 A1 * | 6/2018 | Petruzzelli | H04N 21/440218 |

* cited by examiner

APPARATUS FOR TRANSMITTING TV SIGNALS USING WIFI

TECHNICAL FIELD

The present application relates to the field of television signal transmission, and in particular, to an apparatus for transmitting TV signals using WIFI.

BACKGROUND

With the rapid development of digital technology, information technology and network technology, a profound technological revolution is being triggered in the field of wireless communications. In recent years, there is a sudden surge of types of wireless digital media. In addition to traditional media, emerging media, such as mobile televisions, in-vehicle mobile televisions, building classified televisions, multimedia kiosks, and subway multimedia information systems, have emerged.

In modern communications, means of communication transmission mainly comprises optical fibers, satellites, digital microwaves and the like, which constitutes the main body of information together with the transmission of the terrestrial wireless television and radio and television. At present, the digital television can be divided into three categories in China according to the manner of signal transmission, namely, terrestrial wireless transmission digital television, satellite transmission digital television, and cable transmission digital television. Currently, digital radio and television is generally received in a set-top box manner resulting in that only one program can be watched at the same time and it is difficult to realize when multiple people need to watch different programs at the same time.

SUMMARY

In order to solve the defects in the prior art, the present application provides an apparatus for transmitting TV signals using WIFI. The technical solution is as follows:

An apparatus for transmitting TV signals using WIFI comprises an antenna, 3-way distributors, a television, a first tuning demodulator, a second tuning demodulator, a first decoder, a second decoder, a signal control processing unit and a WIFI communication module, wherein the antenna is electrically connected with the 3-way distributors; the 3-way distributors are electrically connected with the television, the first tuning demodulator and the second tuning demodulator, respectively; the first tuning demodulator and the second tuning demodulator are electrically connected with the first decoder and the second decoder; the first tuning demodulator and the second tuning demodulator are further electrically connected with the signal control processing unit; the first decoder and the second decoder are electrically connected with the signal control processing unit, respectively; the signal control processing unit is electrically connected with the WIFI communication module connected with the mobile user terminal; the signal control processing unit adjusts the resolution of the data according to the information of the mobile user terminal, then encodes, packs and finally sends the data to the WIFI communication module, and the WIFI communication module converts the data into WIFI bit stream to be sent to the mobile user terminal.

After the antenna receives the television signal, the television signal is distributed through the 3-way distributors. One signal can be directly connected with the TV or connected with the TV through the set-top box. The other two signals enter into the first tuning demodulator and the second tuning demodulator, respectively. Through different terminal operation options, the signal control unit can control two tuning demodulators, respectively, so that the two tuning demodulators can independently receive program signals of different frequencies for different users. In combination with the function of converting from TV to the WIFI communication module for transmission, in addition to using TV to watch entertainment video, users are allowed to use mobile phones, tablets, computers and other WiFi-enabled apparatuses to receive video so that users can watch video anywhere, which greatly improves the convenience of watching video. Furthermore, the signal control processing unit may adjust the resolution of the data according to the information of the mobile user terminal, causing that all the different mobile user terminals can watch the video in a smooth and clear manner.

Preferably, after the mobile user terminal is connected to the apparatus, the apparatus may automatically allocate an IP address to the user terminal, and obtain the user network status and screen information based on different network addresses.

The apparatus obtains the user network status and screen information based on different network addresses, and it is processed separately for different users, which is equivalent to processing of data in parallel in the case of multiple users. Thus, the resolution is adjusted for different user apparatuses so that the video play is smooth, the user experience is improved, a good viewing effect is provided to each user in a personalized manner, and products with different resolutions are allowed to be used at the same time.

Preferably, the signal control processing unit adjusts the resolution of the audio and video data according to the size and the pixel density of the screen of the mobile user terminal.

In the present application, the adjustment relationship between the screen size and the pixel density and the resolution is shown in the following table:

| Screen Size (inch) | Pixel Density | Resolution |
| --- | --- | --- |
| 2.8 | 286PPI | 640 × 480 |
| 3.2 | 167PPI | 480 × 320 |
| 3.3 | 297PPI | 854 × 480 |
| 3.5 | 165PPI | 480 × 320 |
| 3.5 | 267PPI | 800 × 480 |
| 3.5 | 280PPI | 854 × 480 |
| 3.5 | 326PPI | 960 × 640 |
| 3.7 | 252PPI | 800 × 480 |
| 3.7 | 298PPI | 960 × 540 |
| 4.0 | 233PPI | 800 × 480 |
| 4.0 | 245PPI | 854 × 480 |
| 4.0 | 275PPI | 960 × 540 |
| 4.0 | 330PPI | 1136 × 640 |
| 4.2 | 262PPI | 960 × 540 |
| 4.3 | 217PPI | 800 × 480 |
| 4.3 | 268PPI | 960 × 640 |
| 4.3 | 256PPI | 960 × 540 |
| 4.3 | 342PPI | 1280 × 720 |
| 4.5 | 245PPI | 960 × 540 |
| 4.5 | 326PPI | 1280 × 720 |
| 4.5 | 490PPI | 1920 × 1080 |
| 4.7 | 490PPI | 1920 × 1080 |
| 4.8 | 306PPI | 1280 × 720 |
| 5.0 | 186PPI | 480 × 800 |
| 5.0 | 256PPI | 1024 × 768 |
| 5.0 | 294PPI | 1280 × 720 |
| 5.0 | 207PPI | 1920 × 1080 |
| 5.3 | 285PPI | 1280 × 800 |
| 5.3 | 207PPI | 960 × 540 |

-continued

| Screen Size (inch) | Pixel Density | Resolution |
| --- | --- | --- |
| 6.0 | 163PPI | 854 × 480 |
| 6.0 | 245PPI | 1280 × 720 |
| 6.0 | 498PPI | 2560 × 1600 |
| 7.0 | 128PPI | 800 × 480 |
| 7.0 | 169PPI | 1024 × 600 |
| 7.0 | 216PPI | 1280 × 800 |
| 9.7 | 132PPI | 1024 × 768 |
| 9.7 | 264PPI | 2048 × 1536 |
| 10 | 170PPI | 1200 × 600 |
| 10 | 299PPI | 2560 × 1600 |

Preferably, the present application further comprises the signal control processing unit adjusting the compression rate of data according to the current transmission rate of the WIFI communication module.

Preferably, the signal control processing unit adjusts the compression rate of data according to the current transmission rate of the WIFI communication module, specifically comprising:
the mobile user terminal sending a request for connection;
the WIFI communication module preparing signal data transmission;
determining the current WIFI environment through the IP of the timing PING local area network; and
reducing the compression rate if the current WIFI environment is good, and increasing the compression rate if the current WIFI environment is poor.

After being multiplexed, the MPEG-2 Transport Stream (TS) coming from the tuning demodulator can obtain different signals such as audio, video and subtitles and then obtain the most primitive data through a decoder (MPEG-2/4). These data are compressed, adjusted and further encoded and packaged by the control processing unit according to the current information of mobile user terminals, transmission rate and the like, then sent to the wireless communication protocol layer, and finally sent to the user terminal through WIFI. After the mobile user terminal is connected to Wi-Fi by sending a request for connection, the terminal apparatus may send out 5 PING commands to obtain the return time of the PING current network. When the average return time is less than 5 milliseconds, it is determined that the current network connection is good. In order to ensure the watching quality in such a situation, the signal compression rate is reduced. When the average return time is greater than 5 milliseconds, it is determined that the current network environment is not very good, then the compression rate needs to be increased so as to ensure smooth watching first of all.

Preferably, the encoding and packing comprises a data encapsulating process and a data encoding process which comprises obtaining a difference image by motion compensation for the image of current frame and previous frame, zero tree coding on the signal of the difference image, and then quantifying, run-length coding and Huffman coding, and then outputting the compressed code stream, in which the previous frame image is exportable out of a frame memory.

Preferably, in the present application, prior to the encoding and packing, the demodulator transcodes the video data first and converts the video data uniformly to the H.264 standard. The transcoding comprises the following steps:
receiving video, and analyzing the video format;
calling the corresponding decoding module according to a specific video format;
decompressing the encoded video data into a baseband signal; and
performing h.264 transcoding for the baseband video signal.

h.264 transcoding consists of two data stream paths, namely, one forward path (from left to right) and one reconstructed path (from right to left), wherein the forward path is as follows: an input frame or field Fn is in unit of macro blocks, each macro block is encoded into an inter-frame or intra-frame mode, and for each block in the macro block, a prediction image P based on the reconstructed image samples is constructed. In the intra-frame mode, P is formed on the samples of the current block which has been encoded, decoded and reconstructed. In the inter-frame mode, the formation of P is formed by motion-compensated prediction from one or two reference images. In the drawings, the reference image is displayed as a pre-encoded image $F'_{n-1}$, but the prediction reference for each macro block partition (the inter-frame mode) may be selected from the past or future images. These images have been encoded, reconstructed and filtered.

The prediction image P is subtracted from the current block to generate a residual block $D'_n$. The $D'_n$ uses block transformation and passivation to generate a given set of coefficients x, which are then entropy encoded and form a compressed bit stream together with information about each block required to be decoded in the macro block, such as the prediction mode, the most significant parameter, the motion inbound information, etc. The bit stream is transmitted to a Network Adaptation Layer (NAL) for transmission and storage. In order to provide a further reference image for prediction, h.264 transcoding must have the function of reconstructing images. Therefore, the residual image must be inversely quantized. The $D'_n$ thus obtained from inversely transforming and the predicted value P is added to $uF'_n$.

In order to extract the noise generated in a codec loop and improve the image quality of the reference frame so as to improve the performance of the compressed image, the present application provides a loop filter. For making the reconstructed image used as a reference image, in the present application, the data is sliced and compressed while being encoded, and the H.264 code stream is output.

Compared with the prior art, the beneficial effects of the present application are as follows:

1. The present application can use an antenna oscillator to share a plurality of tuners, support multi-channel users and save costs by using composite distribution and antenna sharing technology.

2. In addition to the wireless receiving functions such as TV, 4G, AM and FM, the present application also has the function of converting from TV to the WIFI communication module for transmission, so that in addition to using TV to watch entertainment video, users are allowed to use mobile phones, tablets, computers and other WiFi-enabled apparatuses to receive video so that users can watch video anywhere, which great improves the convenience of watching video.

3. The present application can adjust the resolution for different user apparatuses so that the video is played smoothly, the user experience is improved, a good viewing effect is provided to each user in a personalized manner, and products of different resolutions are allowed to be used at the same time.

4. In the environment of different WIFI rates, the present application can automatically adjust the resolution of the output according to the quality of the code rate so that users can watch video smoothly under different code stream conditions to ensure the sense of user experience.

DESCRIPTION OF THE EMBODIMENTS

The present application will be further described in detail below with reference to the drawings and embodiments.

Figure 1:
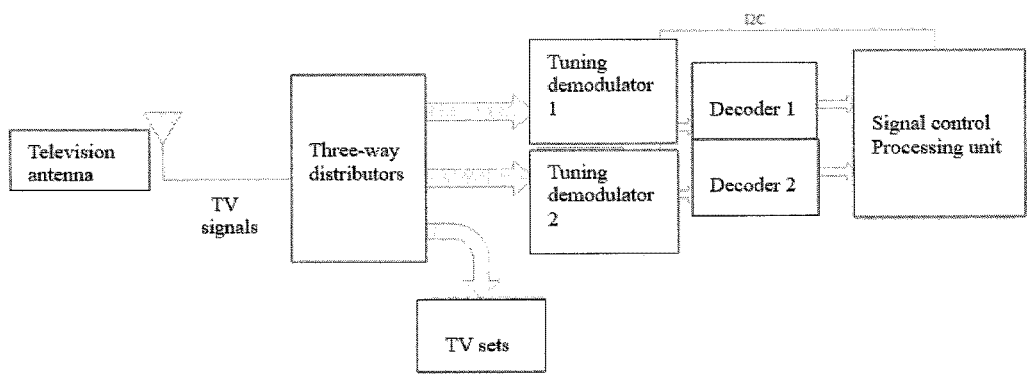
FIG. 1 is a schematic diagram of a system structure according to the present application.
Figure 2:
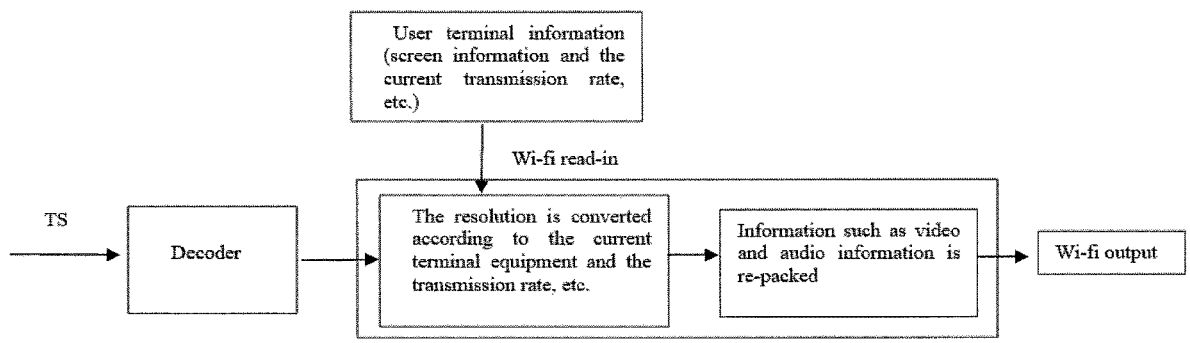
FIG. 2 is a flowchart of the resolution adjustment according to the present application.
Figure 3:
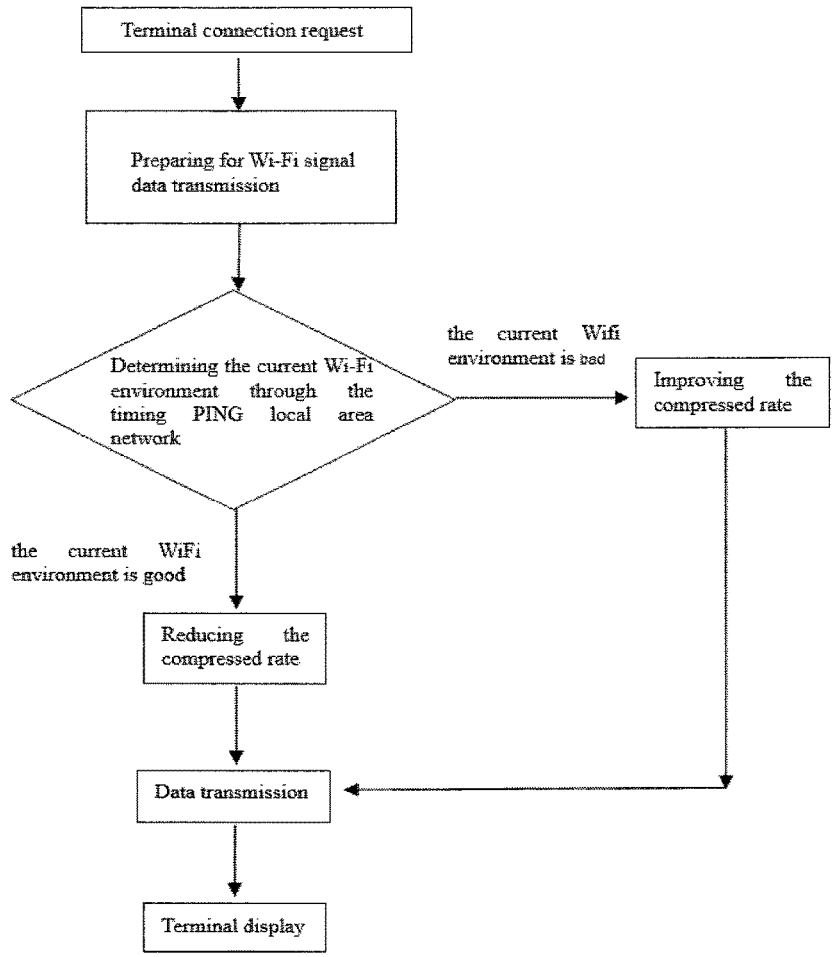
FIG. 3 is a flowchart of the compression ratio adjustment according to the present application.
Figure 4:
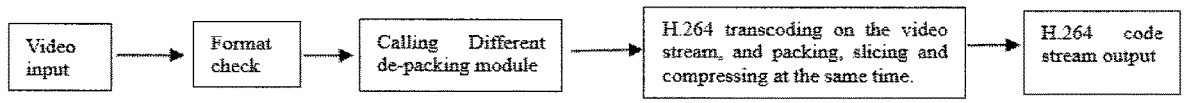
FIG. 4 is a flowchart of H.264 transcoding according to the present application.
Figure 5:
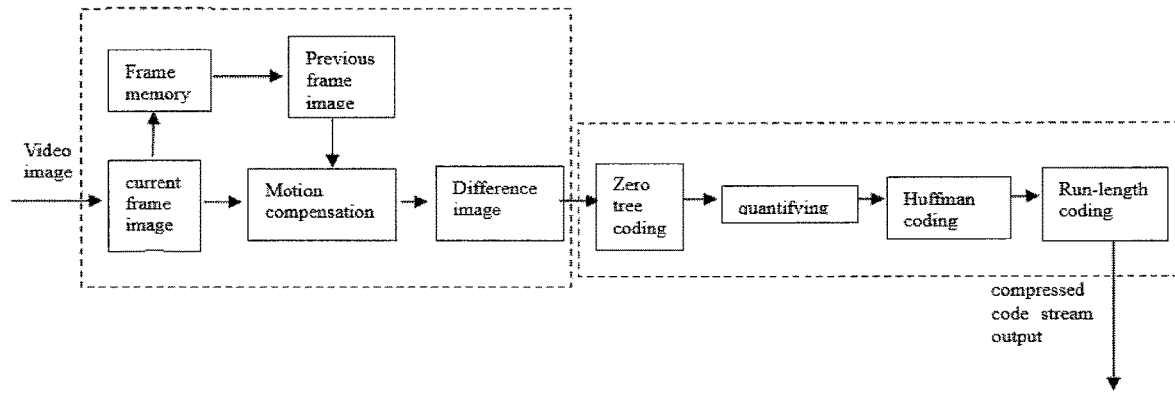
FIG. 5 is a flowchart of the encoding according to the present application.
Figure 6:
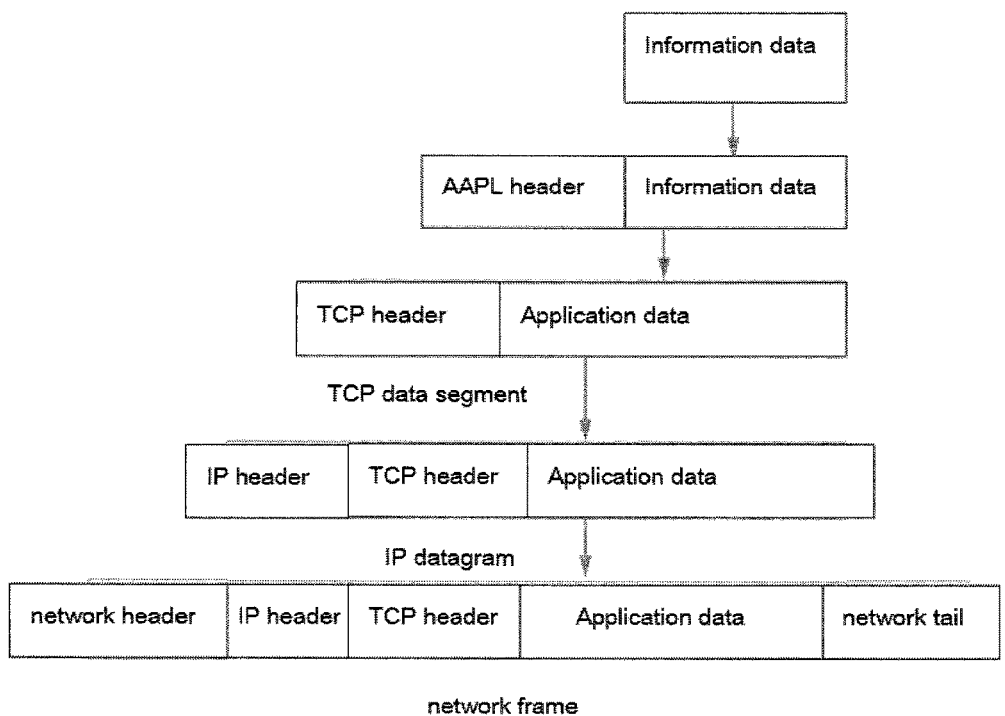
FIG. 6 is a flowchart of the data encapsulating according to the present application.

Embodiments:

As shown in FIG. 1 to FIG. 6, an apparatus for transmitting TV signals using WIFI comprises an antenna, 3-way distributors, a television, a first tuning demodulator, a second tuning demodulator, a first decoder, a second decoder, a signal control processing unit and a WIFI communication module, wherein the antenna is electrically connected with the 3-way distributors; the 3-way distributors are electrically connected with the television, the first tuning demodulator and the second tuning demodulator; respectively, the first tuning demodulator and the second tuning demodulator are electrically connected with the first decoder and the second decoder; the first tuning demodulator and the second tuning demodulator are further electrically connected with the signal control processing unit; the first decoder and the second decoder are electrically connected with the signal control processing unit, respectively; the signal control processing unit is electrically connected with the WIFI communication module connected with the mobile user terminal; the signal control processing unit adjusts the resolution of the data according to the information of the mobile user terminal, then encodes, packs and finally sends the data to the WIFI communication module, and the WIFI communication module converts the data into WIFI stream to be sent to the mobile user terminal.

After the antenna receives the television signal, the television signal is distributed through the 3-way distributors. One signal can be directly connected with the TV or connected with the TV through the set-top box. The other two signals enter into the first tuning demodulator and the second tuning demodulator, respectively. Through different terminal operation options, the signal control unit can control two tuning demodulators, respectively, so that they can independently receive program signals of different frequencies.

After the mobile user terminal is connected to the apparatus, the apparatus automatically may allocate an IP address to the user terminal, and obtain the user network status and screen information based on different network addresses.

The apparatus obtains the user network status and screen information based on different network addresses, and it is processed separately for different users, which is equivalent to processing of data in parallel in the case of multiple users. Thus, the resolution is adjusted for different user apparatuses so that the video play is smooth, the user experience is improved, a good viewing effect is provided to each user in a personalized manner, and products with different resolutions are allowed to be used at the same time.

The signal control processing unit adjusts the resolution of the audio and video data according to the size and the pixel density of the screen of the mobile user terminal.

In the present application, the adjustment relationship between the screen size and the pixel density and the resolution is shown in the following table:

| Screen Size (inch) | Pixel Density | Resolution |
| --- | --- | --- |
| 2.8 | 286PPI | 640 × 480 |
| 3.2 | 167PPI | 480 × 320 |
| 3.3 | 297PPI | 854 × 480 |
| 3.5 | 165PPI | 480 × 320 |
| 3.5 | 267PPI | 800 × 480 |
| 3.5 | 280PPI | 854 × 480 |
| 3.5 | 326PPI | 960 × 640 |
| 3.7 | 252PPI | 800 × 480 |
| 3.7 | 298PPI | 960 × 540 |
| 4.0 | 233PPI | 800 × 480 |
| 4.0 | 245PPI | 854 × 480 |
| 4.0 | 275PPI | 960 × 540 |
| 4.0 | 330PPI | 1136 × 640 |
| 4.2 | 262PPI | 960 × 540 |
| 4.3 | 217PPI | 800 × 480 |
| 4.3 | 268PPI | 960 × 640 |
| 4.3 | 256PPI | 960 × 540 |
| 4.3 | 342PPI | 1280 × 720 |
| 4.5 | 245PPI | 960 × 540 |
| 4.5 | 326PPI | 1280 × 720 |
| 4.5 | 490PPI | 1920 × 1080 |
| 4.7 | 490PPI | 1920 × 1080 |
| 4.8 | 306PPI | 1280 × 720 |
| 5.0 | 186PPI | 480 × 800 |
| 5.0 | 256PPI | 1024 × 768 |
| 5.0 | 294PPI | 1280 × 720 |
| 5.0 | 207PPI | 1920 × 1080 |
| 5.3 | 285PPI | 1280 × 800 |
| 5.3 | 207PPI | 960 × 540 |
| 6.0 | 163PPI | 854 × 480 |
| 6.0 | 245PPI | 1280 × 720 |
| 6.0 | 498PPI | 2560 × 1600 |
| 7.0 | 128PPI | 800 × 480 |
| 7.0 | 169PPI | 1024 × 600 |
| 7.0 | 216PPI | 1280 × 800 |
| 9.7 | 132PPI | 1024 × 768 |
| 9.7 | 264PPI | 2048 × 1536 |
| 10 | 170PPI | 1200 × 600 |
| 10 | 299PPI | 2560 × 1600 |

The present application further comprises the signal control processing unit adjusting the compression rate of data according to the current transmission rate of the WIFI communication module.

The signal control processing unit adjusts the compression rate of data according to the current transmission rate of the WIFI communication module, specifically comprising:

a. the mobile user terminal sending a request for connection;

b. the WIFI communication module preparing signal data transmission;

c. determining the current WIFI environment through the IP of the timing PING local area network; and d. reducing the compression rate if the current WIFI environment is good, and increasing the compression rate if the current WIFI environment is poor.

After being multiplexed, the MPEG-2 Transport Stream (TS) coming from the tuning demodulator can obtain different signals such as audio, video and subtitles and then obtain the most primitive data through a decoder (MPEG-2/4). These data are compressed, adjusted and further encoded and packaged by the control processing unit according to the current information of mobile user terminals, transmission rate and the like, then sent to the wireless communication protocol layer, and finally sent to the user terminal through WIFI. After the mobile user terminal is connected to Wi-Fi by sending a request for connection, the terminal apparatus may send out 5 PING commands to obtain the return time of the PING current network. When the average return time is less than 5 milliseconds, it is determined that the current network connection is good. In order to ensure the watching quality in such a situation, the signal compression rate is reduced. When the average return time is greater than 5 milliseconds, it is determined that the current network environment is not very good, then the compression rate needs to be increased so as to ensure smooth watching first of all.

The encoding and packing comprises a data encapsulating process and a data encoding process which comprises obtaining a difference image by motion compensation for the image of current frame and previous frame, zero tree coding on the signal of the difference image, and then quantifying, run-length coding and Huffman coding, and then outputting the compressed code stream, in which the previous frame image is exportable out of a frame memory.

In the present application, prior to the encoding and packing, the demodulator transcodes the video data first and converts the video data uniformly to the H.264 standard. The transcoding comprises the following steps:
 a. receiving video, and analyzing the video format;
 b. calling the corresponding decoding module according to a specific video format;
 c. decompressing the encoded video data into a baseband signal; and
 d. performing h.264 transcoding for the baseband video signal.

The invention claimed is:

1. An apparatus for transmitting TV signals using WIFI, comprising:
 an antenna;
 3-way distributors;
 a television;
 a first tuning demodulator;
 a second tuning demodulator;
 a first decoder;
 a second decoder;
 a signal control processing unit; and
 a WIFI communication module,
 wherein the antenna is directly electrically connected with the 3-way distributors and the 3-way distributors are electrically connected with the television, the first tuning demodulator and the second tuning demodulator, respectively, such that after the antenna receives a TV signal, the antenna is configured to distribute the TV signal directly to the 3-way distributors and the 3-way distributor is configured to directly transmit a first signal to the television, a second signal to the first tuning demodulator and a third signal to the second tuning demodulator,
 wherein the first tuning demodulator and the second tuning demodulator are electrically connected with the first decoder and the second decoder,
 wherein the first tuning demodulator and the second tuning demodulator are further electrically connected with the signal control processing unit,
 wherein the first decoder and the second decoder are electrically connected with the signal control processing unit, respectively,
 wherein the signal control processing unit is electrically connected with the WIFI communication module connected with a mobile user terminal,
 wherein the signal control processing unit adjusts a resolution of data according to information of the mobile user terminal, then encodes, packs and finally sends the data to the WIFI communication module,
 wherein the WIFI communication module converts the data into WIFI stream to be sent to the mobile user terminal,
 wherein after the mobile user terminal is connected to the apparatus, the apparatus is configured to automatically allocate an IP address to the user terminal, and obtain the user network status and screen information based on different network addresses,
 wherein the signal control processing unit adjusts the compression rate of data according to the current transmission rate of the WIFI communication module, and
 wherein the signal control processing unit adjusts the compression rate of data according to the current transmission rate of the WIFI communication module, specifically comprising:
  the mobile user terminal sending a request for connection;
  the WIFI communication module preparing signal data transmission;
  determining the current WIFI environment through the IP of the timing PING local area network.; and
  reducing the compression rate if the current WIFI environment is good based on an average return rate of a plurality of PING commands, and increasing the compression rate if the current WIFI environment is poor based on the average return rate of the plurality of PING commands.

2. The apparatus for transmitting TV signals using WIFI according to claim 1, wherein the signal control processing unit adjusts the resolution of the audio and video data according to the size and the pixel density of the screen of the mobile user terminal.

3. The apparatus for transmitting TV signals using WIFI according to claim 1, wherein the encoding and packing comprises a data encapsulating process and a data encoding process, and the data encoding flow comprises obtaining a difference image by motion compensation for the image of current frame and previous frame e, zero tree coding on the signal of the difference image, and then quantifying, run-length coding and Huffman coding, and then outputting the compressed code stream, in which the previous frame image is exportable out of a frame memory.

4. The apparatus for transmitting TV signals using WIFI according to claim 1, wherein prior to the encoding and packing, the demodulator transcodes the video data first and converts the video data uniformly to the H.264 standard.

5. The apparatus for transmitting TV signals using WIFI according to claim 4, wherein the transcoding comprises the following steps:
 a. receiving video, and analyzing the video format;
 b. calling the corresponding decoding module according to a specific video format;
 c. decompressing the encoded video data into a baseband signal; and
 d. performing h.264 transcoding for the baseband video signal.

* * * * *